(12) United States Patent
Cooley

(10) Patent No.: US 12,396,403 B2
(45) Date of Patent: Aug. 26, 2025

(54) EJECTION CHUTE FOR AGRICULTURAL BALER

(71) Applicant: CNH Industrial America LLC, New Holland, PA (US)

(72) Inventor: Devin Cooley, Reading, PA (US)

(73) Assignee: CNH Industrial America LLC, New Holland, PA (US)

( * ) Notice: Subject to any disclaimer, the term of this patent is extended or adjusted under 35 U.S.C. 154(b) by 233 days.

(21) Appl. No.: 18/211,413

(22) Filed: Jun. 19, 2023

(65) Prior Publication Data

US 2024/0415064 A1    Dec. 19, 2024

(51) Int. Cl.
*A01F 15/08* (2006.01)

(52) U.S. Cl.
CPC .............................. *A01F 15/0875* (2013.01)

(58) Field of Classification Search
None
See application file for complete search history.

(56) References Cited

U.S. PATENT DOCUMENTS

| 5,742,010 A * | 4/1998 | Griffin | G01G 19/08 |
| | | | 177/253 |
| 7,127,985 B2 * | 10/2006 | Standlee | A01F 15/0875 |
| | | | 53/399 |
| 7,895,944 B2 * | 3/2011 | Derstine | A01F 15/005 |
| | | | 100/246 |
| 8,915,182 B2 | 12/2014 | Van Groenigen | |
| 8,978,550 B2 * | 3/2015 | Demon | A01F 15/0875 |
| | | | 199/7 |
| 10,058,037 B2 * | 8/2018 | Kraus | A01F 15/145 |
| 2014/0216279 A1 * | 8/2014 | Van Groenigen | A01F 15/0875 |
| | | | 100/4 |
| 2018/0020621 A1 * | 1/2018 | Jones | A01F 15/0705 |
| | | | 56/341 |
| 2021/0227754 A1 * | 7/2021 | Pramod | A01F 15/0705 |
| 2023/0180668 A1 * | 6/2023 | Russell | A01F 15/14 |
| | | | 56/341 |

FOREIGN PATENT DOCUMENTS

EP    0650664 A1    5/1995

* cited by examiner

*Primary Examiner* — Gene O Crawford
*Assistant Examiner* — Muhammad Awais
(74) *Attorney, Agent, or Firm* — Buchanan Ingersoll & Rooney PC

(57) ABSTRACT

An agricultural baler includes a bale chamber having a discharge outlet and a bale ejection system configured to discharge bales from the bale chamber on the ground surface of the field. The bale ejection system includes a chute with a first half portion and a second half portion that receives a first bale and a second bale discharged simultaneously from the discharge outlet in the first half portion and the second half portion, respectively, and an ejection actuator that pushes the second bale from the second half portion of the chute to the first half portion of the chute.

19 Claims, 7 Drawing Sheets

EJECTION CHUTE FOR AGRICULTURAL BALER

FIELD OF THE INVENTION

The present invention relates to agricultural balers, and, more particularly, to ejection systems used with square agricultural balers.

BACKGROUND OF THE INVENTION

Agricultural harvesting machines, such as balers, for example, are used to consolidate and package crop material so as to facilitate the storage and handling of the crop material for later use. In the case of hay, a mower-conditioner cuts and conditions the crop material for windrow drying in the sun. In the case of straw, an agricultural combine discharges non-grain crop material from the rear of the combine defining the straw (such as wheat or oat straw, for example) which is to be picked up by the baler. The cut crop material is typically raked and dried, and a baler, such as a round baler or a square baler, for example, straddles the windrows and travels along the windrows to pick up the crop material and form it into round or square bales. More specifically, a pickup unit at the front of the baler gathers the cut and windrowed crop material from the ground and then conveys the cut crop material into a bale-forming chamber within the baler where the crop material is compacted, typically by means of a reciprocating plunger. The bale-forming chamber usually includes a device for tying bales and a discharge outlet, for example connected to a discharge chute for gently lowering bales onto the field. During normal baling operation, tied bales are ejected from the baler through action of the plunger.

Square agricultural balers are sometimes preferred because the square-shaped bales facilitate stacking, delivery, and use. During baling, a small square baler produces two small square bales simultaneously, and there is a need to align the ejected bales consecutively in a single row. If the bales are not aligned in a single row, an operator with a bale bundler cannot drive in a straight line to pick up the small square bales, but instead, will have to swerve back and forth to pick up bales that are ejected side by side. It is, therefore, inconvenient if the two simultaneously ejected bales land side by side after being ejected from the bale-forming chamber.

What is needed in the art is an agricultural baler with an ejection system that can position simultaneously ejected bales consecutively along the same path in the field.

SUMMARY OF THE INVENTION

Described herein is an improved ejection system for agricultural balers. The ejection system ensures that simultaneously ejected bales are positioned in the field consecutively along the same path by ejecting one bale at a time.

An agricultural baler includes an ejection system that ejects bales that are discharged simultaneously from the bale-forming chamber one bale at a time. Although both bales slide from the bale-forming chamber onto the chute at the same time, only the first bale continues to slide directly off the chute and is ejected onto the ground surface of the field due to the chute being angled downward. The second bale slides down off the chute, but is stopped by a wall, ridge or lip formed at the bottom end of the chute. After the first bale has been ejected from the chute onto the ground surface of the field, an ejection actuator pushes the second bale in the lateral direction and slides it over to the side of the chute that does not have a wall, ridge or lip formed at the bottom end of the chute. The ejection actuator then retracts, thereby allowing the second bale to freely slide off the chute, like the first bale. This operating sequence results in the placement of the two ejected bales consecutively along the same path on the field.

A method for ejecting bales that are discharged simultaneously from the bale-forming chamber one bale at a time is also provided.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION OF THE INVENTION

The terms "forward," "rearward," "upward," "downward," "left," and "right," when used in connection with the agricultural baler described herein and/or components thereof are usually determined with reference to the direction of forward operative travel of the towing vehicle and the height of the baler, but they should not be construed as limiting. The terms "longitudinal" and "transverse" are determined with reference to the fore-and-aft direction of the towing vehicle and the width of the baler, and are equally not to be construed as limiting.

Figure 1:
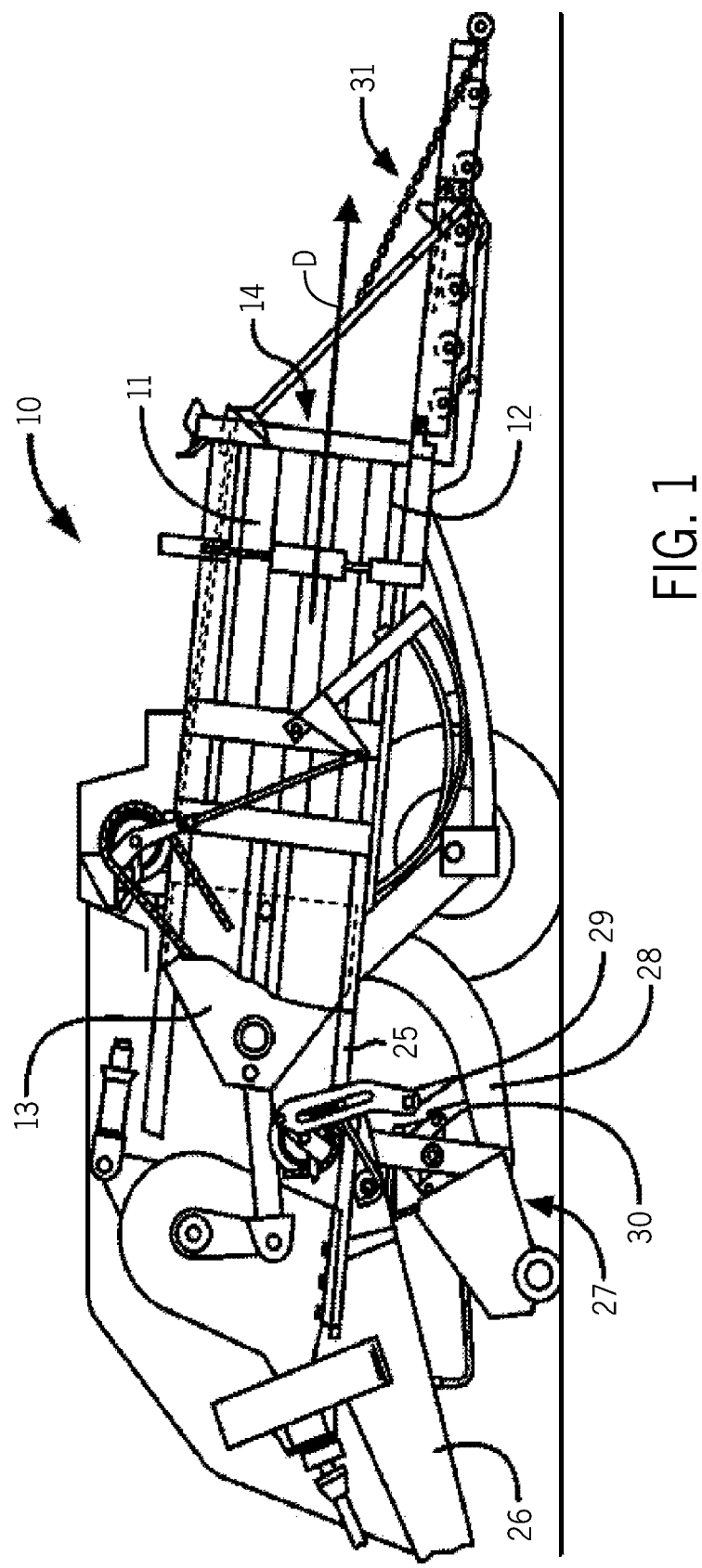
FIG. 1 illustrates an embodiment of a square agricultural baler to which a bale ejection system according to embodiments described herein may be applied.

Referring now to the drawings, and more particularly to FIG. 1, illustrated is an agricultural baler 10, which can be connected to and pulled behind an agricultural vehicle, such as a tractor (not shown), for example. The baler 10 includes a frame 25 which is equipped with a forwardly extending tongue 26 at its front end with hitch means (not shown) for coupling the baler 10 to a towing tractor (shown in FIG. 7).

The baler 10 may operate on a two-stage feeding system. A pick-up assembly 27 lifts windrowed crop material off the field as the baler 10 is being pulled by a tractor, and delivers such material into the front end of a rearwardly and upwardly curved, charge-forming feeder duct 28. The duct 28 communicates at its upper end with an overhead, fore-and-aft extending bale-forming chamber 11 into which crop charges are loaded by a cyclically operating stuffer mechanism 29. A continuously operating packer mechanism 30 at the lower front end of the feeder duct 28 continuously feeds and packs material into the duct 28 as to cause charges of the crop material to take on and assume the internal configuration of the duct 28 prior to periodic engagement by the stuffer 29 and insertion up into the bale-forming chamber 11. Each action of the stuffer mechanism 29 introduces a "charge" or "flake" of crop material from the duct 28 into the chamber 11. The packer mechanism 30 functions as the first stage for crop material compression.

The crop material can be transported into the bale-forming chamber 11 of the baler 10 with a conveyor, such as a rotating conveying rotor, for example. A plunger 13 reciprocates in a fore-and-aft direction 'D' within the bale-forming chamber 11. Biomass fed via the feeder duct 28 is thereby compacted, e.g., compressed or otherwise treated, so as to form rectangular bales in the above-described operation of the agricultural baler 10. These carrier elements are movable so that the bale-forming chamber 11 can initially contract and subsequently expand to maintain an appropriate amount of pressure on the periphery of the bale. The plunger 13 compresses the wads of crop material into flakes to form a rectangular or square bale and, at the same time, gradually advances the bale toward a discharge outlet 14 of the bale-forming chamber 11, from where the bales may eventually be ejected. Together, the plunger 13 and the bale-forming chamber 11 function as the second stage for crop compression.

The baler 10 may include components, such as a tying assembly or a knotter mechanism for automatically wrapping and tying the completed bales with a tie twine or similar lineal object, to make the bales self-supporting, for example for shipping and storage. When enough flakes have been added and the bale reaches a full (or other predetermined) size, the tying assembly is actuated in order to wrap and tie twine around the bales while the bales are still in the bale-forming chamber 11. Once tied, the bales are discharged from the discharge outlet 14 of the bale-forming chamber 11 onto a discharge structure in the form of a chute 31, for gently lowering the bales near ground level onto the field.

Further details of baler 10 may be described in U.S. Patent App. Pub. No. 2013/0019765, which is incorporated by reference herein in its entirety and for all purposes.

In a first aspect, an ejection system 200 is provided for an agricultural baler 10, more particularly a small square baler or a rectangular baler, i.e., a machine for forming square or rectangular bales from agricultural crop material. In a small square baler, for example, the bales are discharged simultaneously from the discharge outlet 14 of the bale-forming chamber 11, usually with the two bales positioned next to each other or in parallel relative to the side walls of the baler 10.

The ejection system 200 according to embodiments of the present invention may be a separate structure for being added or retro-fitted into an existing agricultural baler. Alternatively, the ejection system 200 may be built into an agricultural baler.

Figure 2:
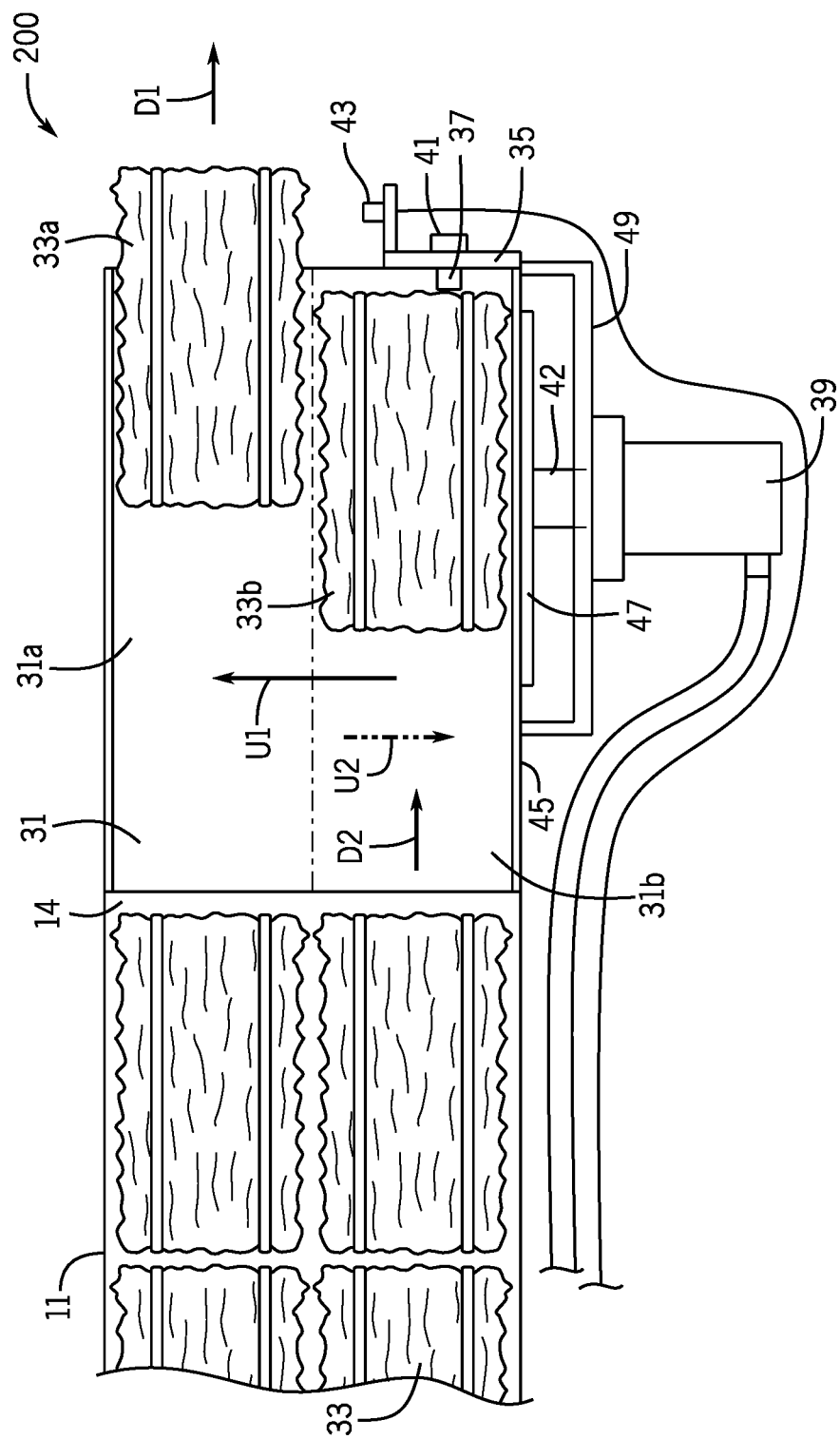
FIG. 2 is a top plan view of a bale ejection system of the baler of FIG. 1, which is shown schematically, according to an embodiment.

According to an aspect of the present invention, and referring now specifically to FIG. 2, a bale ejection system 200 includes bale-forming chamber 11 where formed square bales 33 are arranged in multiple rows of two bales 33 positioned next to each other in each row. A chute 31 (see also FIG. 1) is operatively connected to the discharge outlet 14 of the bale-forming chamber 11 and simultaneously receives bales 33 as the bales 33 are discharged from the discharge outlet 14 of the bale-forming chamber 11. The chute 31 includes two half portions 31a and 31b (illustrated in FIG. 2 as being separated by an imaginary dashed line) each of which extend downwardly at an angle from the discharge outlet 14 of the bale-forming chamber 11 toward the ground surface of the field. Alternatively, only half portion 31a may extend downwardly at an angle, and half portion 31b may be oriented horizontally (i.e., not angled downward). Two bales 33a and 33b slide from the bale-forming chamber 11 onto the chute 31 at the same time and substantially parallel to each other. Each of the two bales 33a and 33b slides out from the bale-forming chamber 11 in the forward and downward direction D1 and D2, for example, onto a corresponding half portion 31a or 31b, respectively, of the chute 31, and advances by force of gravity to the bottom end 35 (e.g., the end closer to the ground surface of the field than to the bale-forming chamber 11) of the chute 31. A wall, ridge or lip 37 is formed at the bottom end 35 of the second half portion 31b of the chute 31. There is no similar wall, ridge or lip to the ridge or lip 37 formed at the bottom end 35 of the first half portion 31a of the chute 31.

In operation, a first bale 33a continues to slide directly off the chute 31, through the first half portion 31a of the chute 31, and onto the ground surface of the field because the chute 31 by design is substantially angled downward (see FIG. 1). Similarly, a second bale 33b slides off the chute 31, through the second half portion 31b of the chute 31, down to the bottom end 35 of the second half portion 31b of the chute 31, but is stopped there by the wall, ridge or lip 37 formed at the bottom end 35 of the second half portion 31b of the chute 31. The wall, ridge or lip 37 formed at the bottom end 35 of the second half portion 31b of the chute 31 is configured to stop, and delay, the downward movement of the second bale 33b until the first bale 33a has been ejected from the chute 31 onto the ground surface of the field.

Turning back to FIG. 2, an ejection actuator 39 is built into, for example, the second half portion 31b of the chute 31, e.g., the portion of the chute 31 with the wall, ridge or lip 37 formed at the bottom end 35 of the chute 31. The ejection actuator 39 can be, for example, an electric linear actuator, a pneumatic cylinder, or a hydraulic cylinder, e.g., a double acting hydraulic cylinder having a moveable piston and controlled by a hydraulic control circuit (illustrated in FIG. 5, for example). However, embodiments are not limited to this configuration, and in other embodiments, the ejection actuator 39 may include a pulley system, an electric motor, a solenoid, etc.

Turning back to the embodiment illustrated in FIG. 2, the ejection actuator 39 is configured for pushing the second bale 33b stopped by the wall, ridge or lip 37 at the bottom end 35 of the second half portion 31b of the chute 31 in the lateral direction U1. Stated differently, ejection actuator 39 is configured for pushing the second bale 33b towards the first half portion 31a of the chute 31 for ejection therefrom. The ejection actuator 39 may be configured to be mounted to one of the walls, e.g., a side wall 45 of the chute 31, for example. Optionally, a cylinder support 49 may be provided between the wall 45 and the ejection actuator 39 for mounting and securing the ejection actuator 39 to the wall 45 of the chute 31.

The ejection actuator 39 can include a rod 42 and a pusher plate 47. Movement of the rod 42 within the cylinder of the ejection actuator 39 translates to the pusher plate 47. For example, when the rod 42 is extended (see FIG. 3), the pusher plate 47 may be driven in the direction U1 towards the first half portion 31a of the chute 31. Conversely, when the rod 42 is retracted, the pusher plate 47 may be driven in the direction U2 towards the second half portion 31b of the chute 31. The pusher plate 47 can, for example, be mounted slightly retracted from the inner surface of the wall 45 to avoid interference with bale 33b prior to bale 33b being pushed onto first half portion 31a.

Figure 3:
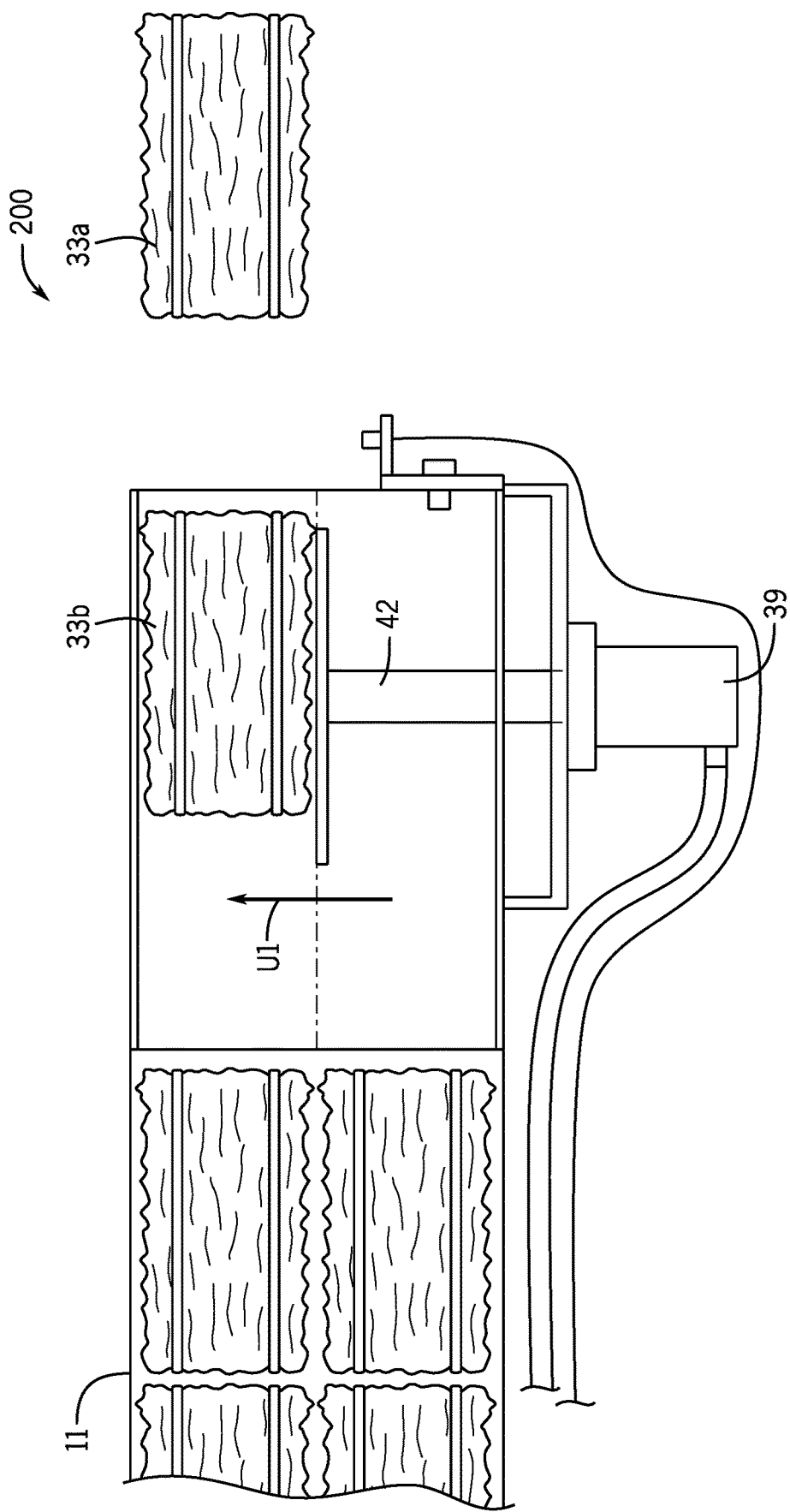
FIG. 3 is a top plan view of the bale ejection system of FIG. 2 with an actuated ejection actuator.
Figure 4:
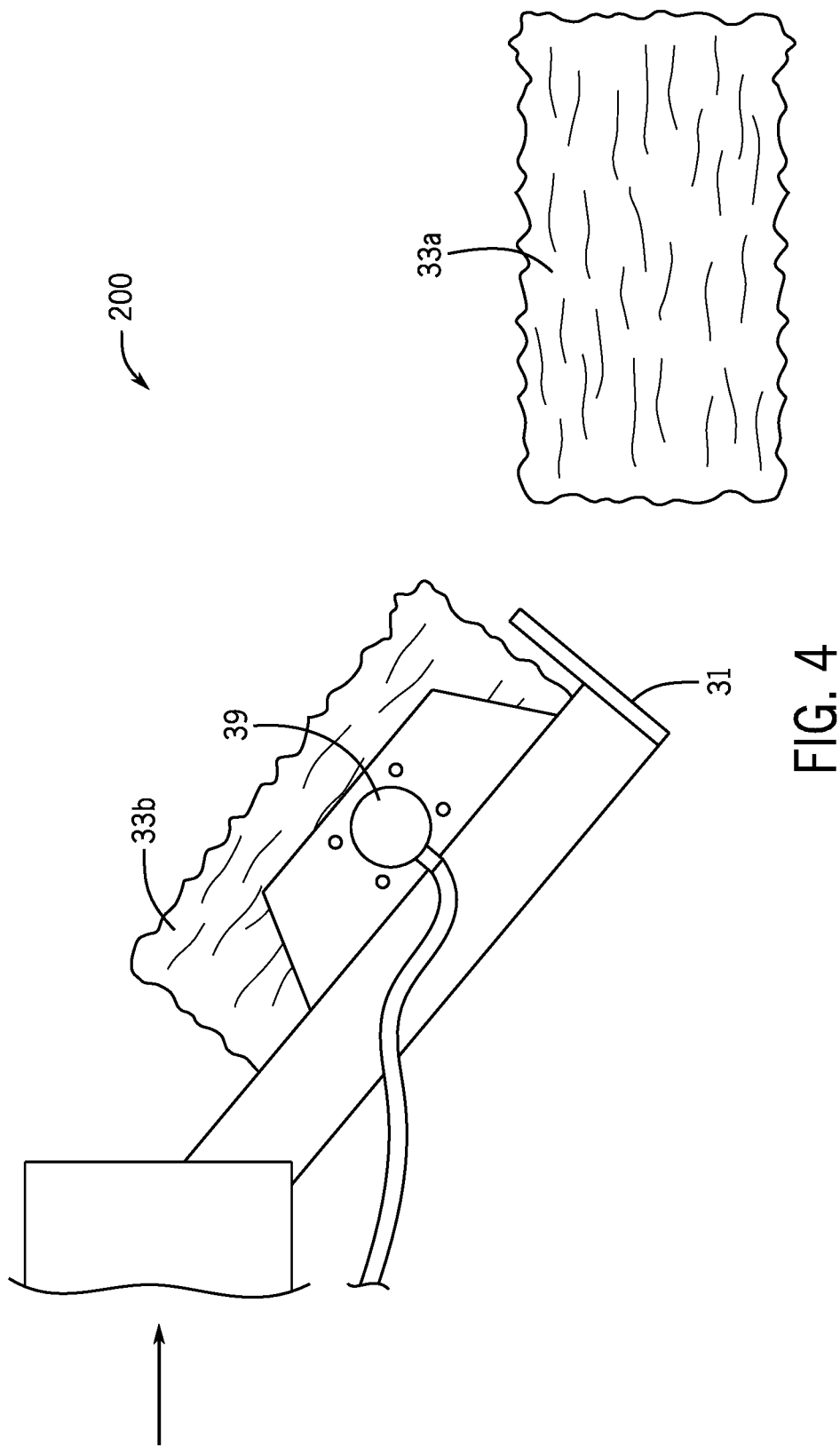
FIG. 4 is a side elevation view of a bale ejection system.

Turning back to the operation of the bale ejection system 200, after the first bale 33a has finished sliding off the chute 31 and onto the ground surface of the field, the bale ejection system 200 triggers the ejection actuator 39 to push the second bale 33b in the lateral direction U1 towards the first half portion 31a of the chute 31. FIG. 3 illustrates the ejection actuator 39 in an actuated state. In the illustrated embodiment, the piston of the ejection actuator 39 is extended in the lateral direction U1, thereby pushing the second bale 33b placed on the pusher plate 47 in the lateral direction U1 onto the first half portion 31a of the chute 31.

After the second bale 33b has been pushed over or slid over to the first half portion 31a of the chute 31, the second bale 33b freely slides off the chute 31 and onto the ground surface of the field, similar to the sliding movement of the first bale 33a. And, the ejection actuator 39 retracts, thereby allowing the next second bale 33a to enter the second half portion 31b of the chute 31.

Because the length of the chute 31 is (or may be) larger than the length of the bales 33, the bales 33 can slide down the chute 31 and the second bale 33b can have a certain dwell time before the next bales 33 are released from the bale-forming chamber 11 into the chute 31. This dwell time can provide enough time for the second bale 33b to slide over to the first half portion 31a of the chute 31 before the next bales 33 come down from the bale-forming chamber 11 into the chute 31.

In certain embodiments, the ejection actuator 39 can be a hydraulic cylinder or an electronic actuator, for example.

The ejection actuator 39 can be connected to a controller, an actuation circuit, or to other systems of the baler 10 by a hydraulic hose or a conduit, and/or by way of electric wires, cables, a bundle of wires or cables, or a wiring harness that includes various stranded or solid wires that interconnect the ejection actuator 39 with various mechanical, hydraulic, or electrical components of the baler 10, for example.

Figure 5:
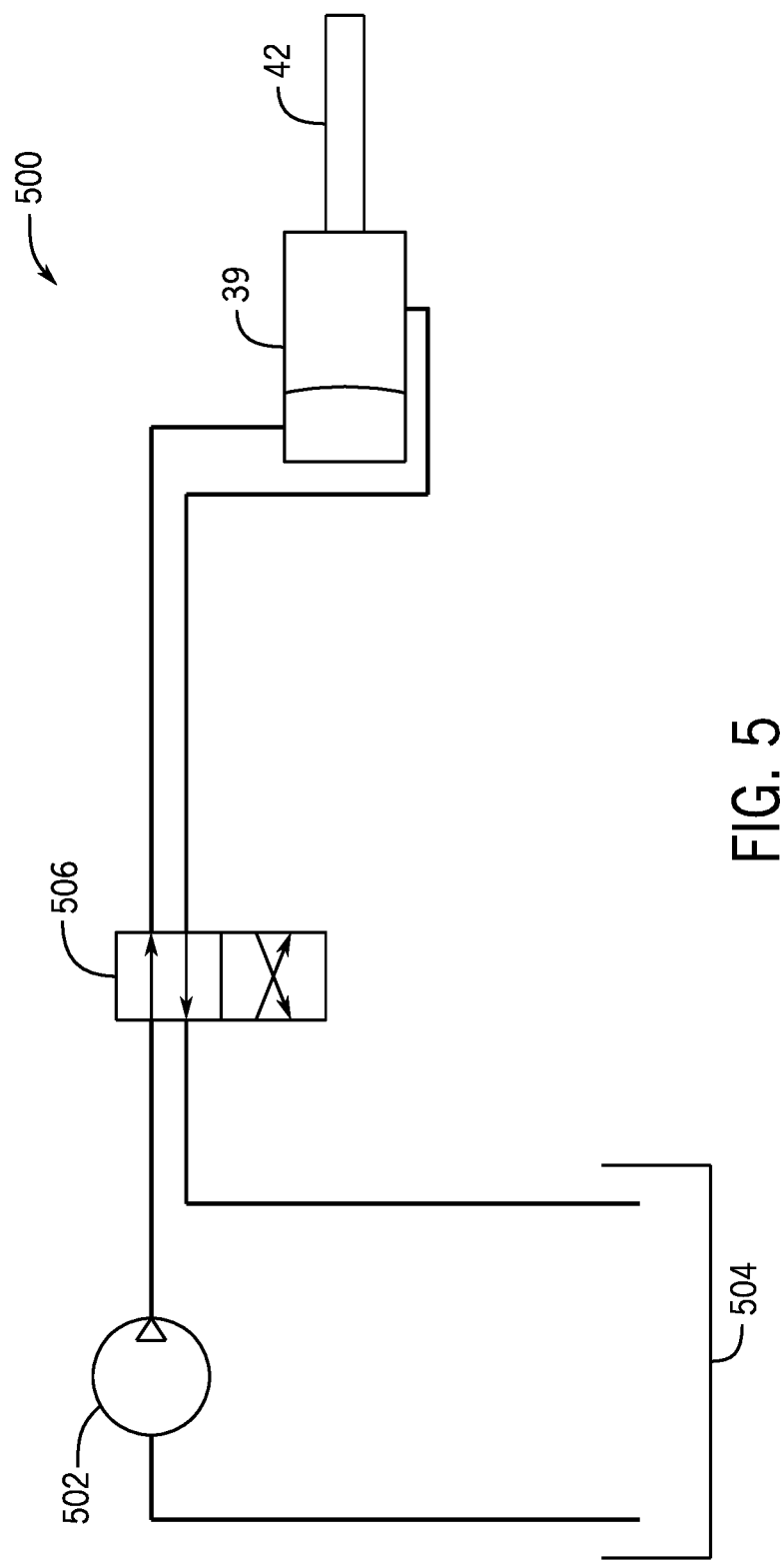
FIG. 5 is a schematic diagram of an exemplary hydraulic control circuit for use with the bale ejection system according to an embodiment.

In the embodiments in which the ejection actuator 39 is a hydraulic cylinder, the bale ejection system 200 can include a hydraulic control circuit 500, an exemplary embodiment of which is depicted in FIG. 5, for example. The hydraulic control circuit 500 can include a hydraulic pump 502, such as a unidirectional hydraulic pump, for example, for pumping hydraulic fluid from a fluid reservoir 504 into the hydraulic control circuit 500. An outlet of the pump 502 and an inlet of the reservoir 504 may be connected to a directional-control valve 506, e.g., a 4-port 2-position directional-control valve or a three-way valve, for example, operable by means of a lever or a button, or by means of an electronic control unit, having work ports connected to the ejection actuator 39, for example, to control the hydraulic fluid flow to the hydraulic cylinder of the ejection actuator 39. The directional-control valve 506 can be configured for switching the flow direction between the retracted position (FIG. 2) and the extended position (FIG. 3) of the ejection actuator 39. This way, the ejection actuator 39 will move in the lateral direction U1 in one setting of the directional-control valve 506 while moving in the reverse direction U2 in the other setting of the directional-control valve 506. Switching between both settings of the directional-control valve 506 will therefore result in reciprocation of the ejection actuator 39, and thereby in pushing a bale 33b in the lateral direction U1 towards the first half portion 31a of the chute 31. The directional-control valve 306 may further include a third, neutral setting (not illustrated in FIG. 5), in which hydraulic fluid flow is inhibited, for disabling the ejection actuator 39.

Alternatively, the ejection actuator 39 may be disabled by powering down the hydraulic pump 502. The hydraulic control circuit 500 may further include means for automatic switching between the first and second setting of the directional-control valve 506, e.g., at a fixed frequency, for example driven by an electric resonator circuit (not shown), in order to automate the reciprocating motion of the ejection actuator 39 to push a bale 33b in the lateral direction U1.

Figure 6:
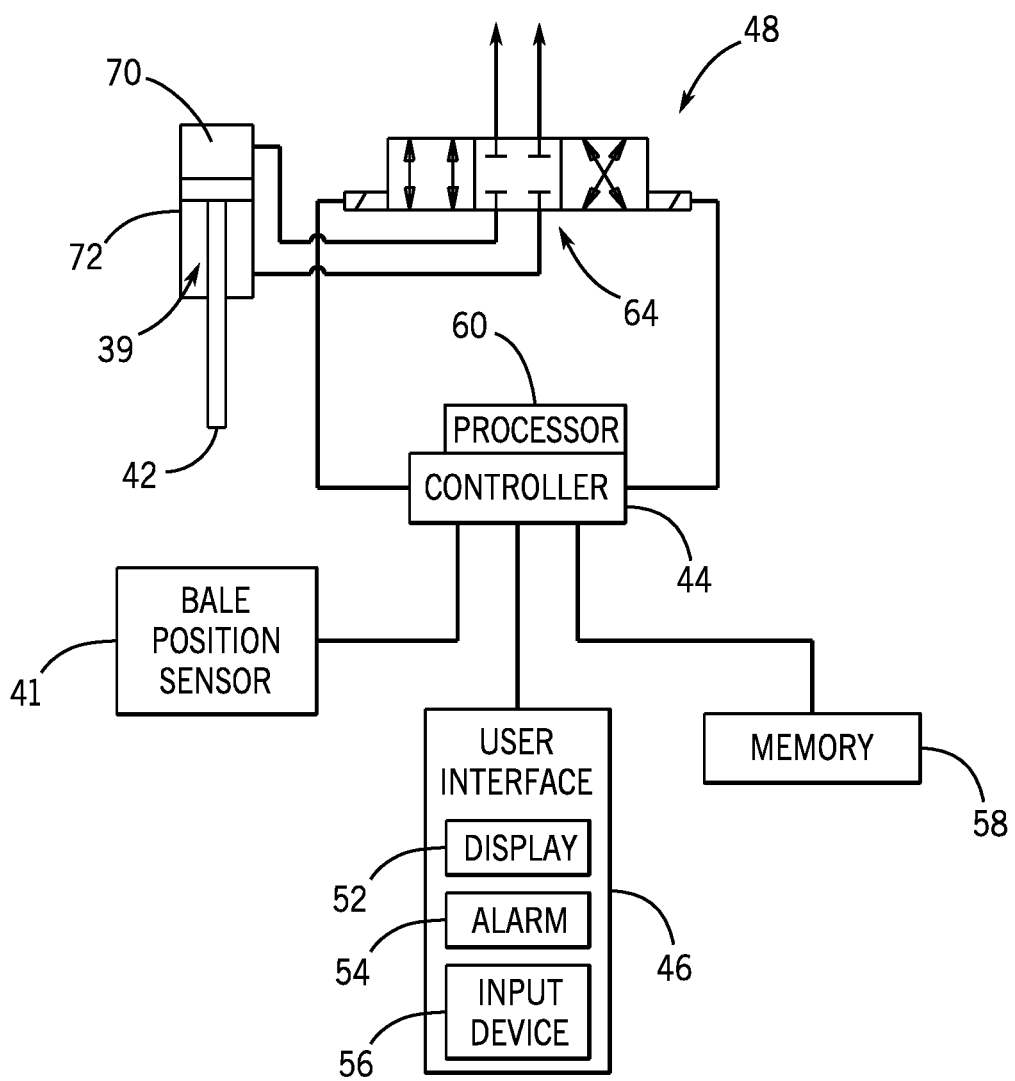
FIG. 6 is a schematic diagram of an exemplary control circuit for use with the bale ejection system according to an embodiment.

To facilitate management of the baling process, the bale ejection system 200 can include a control system 48, illustrated in FIG. 6, for example. In the illustrated embodiment, the control system includes a controller 44, a user interface 46, at least one bale position sensor 41, and a hydraulic control circuit similar to the hydraulic control circuit 500 shown in FIG. 5, for example. The controller 44 can be configured to receive signals from the operator through the user interface 46 and from sensors (e.g., the bale position sensors 41 and 43 discussed below) associated with the bale ejection system 200. In addition, the controller 44 can be configured to send signals to the hydraulic control circuit 500 to operate valve(s) that control fluid flow to the hydraulic cylinder of the ejection actuator 39. For example, the controller 44 can be configured to receive the signal from the bale position sensor 41 and to send a control signal to the hydraulic control circuit 500 to activate a piston of the ejection actuator 39 to extend and retract (e.g., via pumps, valves, etc.). Specifically, in the embodiment illustrated in FIG. 6, the controller 44 may send a signal to a three-way valve 64. The signal from the controller 44 can instruct the three-way valve 64 to move into a position that enables hydraulic fluid to flow to a cap end 70 of the actuator 39. At the cap end 70, the pressure of the hydraulic fluid causes the piston rod 42 to extend out of the cylinder 72, into an extended position. As a result, the pusher plate 47 may be driven in the lateral direction U1 towards the first half portion 31a of the chute 31, as illustrated in FIG. 3, for example. Conversely, the controller 44 may send another signal to the three-way valve 64 that instructs the three-way valve 64 to move into a position that enables hydraulic fluid to drive the piston rod 42 back into the cylinder 72, into a retracted position. As a result, the pusher plate 47 may be driven in the direction U2 towards the second half portion 31b of the chute 31, as illustrated in FIG. 2, for example.

In the embodiment illustrated in FIG. 6, the control system 48 includes a memory 58 and a processor 60. The memory 58 may be any type of non-transitory machine readable medium for storing data and executable instructions, such as random-access memory, read-only memory, rewritable flash memory, hard drives, optical discs, and the like. The processor 60 may execute instructions stored on the memory 58. For example, the memory 58 may contain machine readable code, such as instructions, that may be executed by the processor 60. In some embodiments, the memory 58 and processor 60 may enable automatic (e.g., processor/memory controlled) ejection of the bales 33a, 33b.

Embodiments of the ejection actuator 39 are not limited to a hydraulic cylinder, and in other embodiments, other types of actuator assemblies may be used. For example, an electric actuator, a mechanical actuator, or the like, may be used instead of the three-way valve 64 and hydraulic fluid to control movement of the pusher plate 47. In certain embodiments, for example, the ejection actuator 39 may include an electric motor to move the pusher plate 47 between the first half portion 31a of the chute 31 (FIG. 3) and the second half portion 31b of the chute 31 (FIG. 2).

In other embodiments, the bale ejection system 200 can use a mechanical, e.g., lever system, to push or move the second bales 33b over to the first half portion 31a of the chute 31 where there is no wall, ridge or lip at the bottom end 35 of the chute 31 that would otherwise prevent the second bales 33b from sliding off the chute 31.

Turning back to FIG. 2, the ejection actuator 39 can be triggered in multiple ways. For example, a first sensor 41 can be arranged near the pusher plate 47 of the ejection actuator 39 (e.g., on the side wall 45 of the chute 31 or on the wall, lip or ridge 37) and configured to sense when a second bale 33b is loaded on the pusher plate 47 and ready to be pushed over to the first half portion 31a of the chute 31. A second sensor 43 can be arranged in near proximity to the bottom end 35 of the first half portion 31a of the chute 31 and configured to sense when a bale 33a has just been ejected from the chute 31 in order to actuate the ejection actuator 39 to push the second bale 33b over to the first half portion 31a of the chute 31.

In certain embodiments, the controller 44 may determine the position of the bales 33b and 33a based on signals received from the first sensor 41 and the second sensor 43, respectively. The controller 44 may then send a signal to user interface 46 indicative of the bale position (e.g., a visual indication, an auditory alarm, etc.). For example, the controller 44 may send a signal to the user interface 46 indicating that the bale 33a has just been ejected from the chute 31 based on the signal the controller 44 receives from the second sensor 43. The signal could be a visual indication (e.g., a flashing message on display 52, an illuminated section on the display 52, etc.), an auditory alarm, or a combination thereof. In addition, the controller 44 may send an alert signal to alarm 54 when the bale 33a has not been ejected from the chute 31. The alert signal may continue until the bale 33a has been ejected from the chute 31 and/or the user interface 46 may show the bale 33a position on the display 52.

Another way of triggering the ejection actuator 39 can be by monitoring a dwell time, without using the second sensor 43. For example, the controller 44 of the ejection system 200 can sense, e.g., with the first sensor 41, that a second bale 33b has been placed, e.g., on the pusher plate 47 of the ejection actuator 39, in a position to be pushed over to the first half portion 31a of the chute 31 by the ejection actuator 39. After the placement of the second bale 33b is detected, the controller 44 can wait for a predetermined period of time (e.g., 5 seconds) before actuating the ejection actuator 39 to push the second bale 33b in the lateral direction U1 and to move the second bale 33b over to the first half portion 31a of the chute 31, where there is no wall, ridge or lip (similar to the wall, ridge or lip 37) at the bottom end 35 of the chute 31 that would otherwise keep the second bale 33b from sliding off the chute 31. The predetermined period of dwell time can be pre-defined or pre-programmed in the memory 58 of the controller 44 to be long enough to allow the first bale 33a to clear the chute 31 (e.g., to be fully ejected from the chute 31 onto the ground surface of the field) before actuating the ejection actuator 39 to push the second bale 33b over to the ejection position.

The bale-shifting operating sequence of the bale ejection system 200 described herein results in the placement of the two bales (e.g., 33a and 33b), which are simultaneously ejected from the bale-forming chamber 11, consecutively along the same path or the same line on the ground surface of the field. Due to the delayed ejection of the second bale 33b until after the first bale 33a has been ejected from the chute 31 onto the ground surface of the field, the first bale 33a and the second bale 33b can be ejected in a spaced arrangement relative to each other as the baler 10 moves along the field. The spaced arrangement can be longitudinal and along the same path as the moving direction of the baler 10, due to time delay created by slowing the ejection of the second bale 33b relative to the ejection of the first bale 33a. The ejection of the bales 33a and 33b in a spaced arrangement relative to each other and along the same path on the ground surface of the field facilitates efficient collection of the bales 33 by enabling the operator of a bale bundling equipment to drive in a straight line through the field and pick up both bales, without having to deviate from the driving direction. The arrangement of the ejected bales 33 along the same path on the field allows the same bale bundling equipment to pick up both bales, as opposed to making two trips across the same path if the bales 33 were ejected side by side, in two separate lines.

Figure 7:
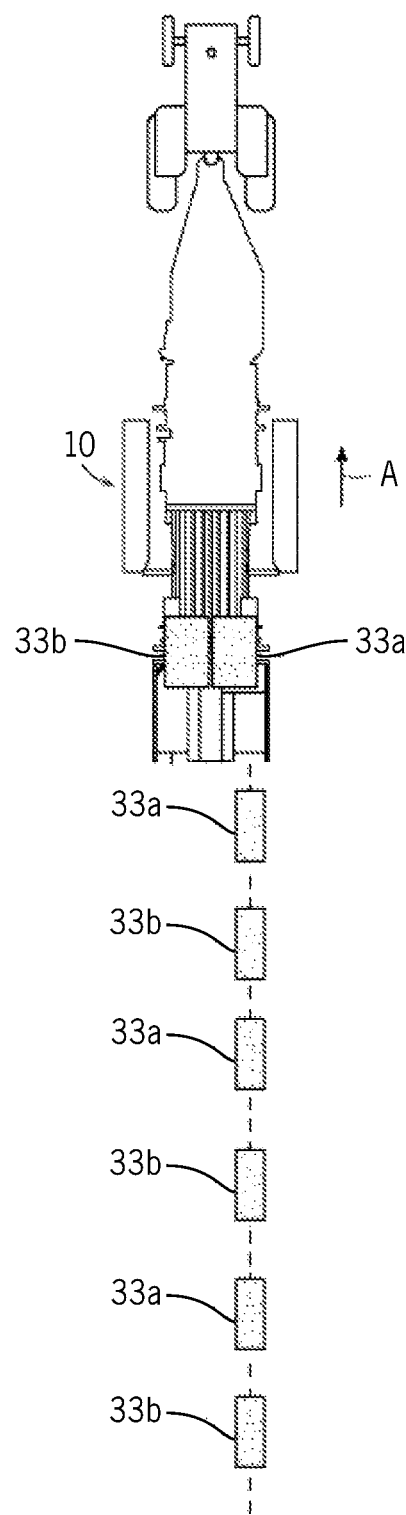
FIG. 7 is a schematic view of the positioning of bales in a field ejected with the bale ejection system according to an embodiment.

The improved ejection of the bales 33a and 33b along the same path as the moving direction of the baler 10 is illustrated in FIG. 7, for example. In FIG. 7, the movement of the baler 10 along the field is represented by an arrow A. The first bales 33a and the second bales 33b form a single line of bales behind one of the half portions (e.g., 31a) of the chute 31. As the baler 10 moves along the field carrying bales of picked up crop material, the ejection system 200 described herein ejects each of the bales 33a and 33b in a time-staggered manner to form a single bale collection path, which improves the efficiency of collection of the bales 33 with a single trip along a single collection path.

The ejection system 200 illustrated in the figures and described above can be implemented in any hay and forage agricultural vehicle that harvests a grass type crop, including but not limited to pull-type forage harvester grass pickups, self-propelled forage harvester grass pickups, small square baler pickups, or large square baler pickups, for example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a bale chamber having a discharge outlet; and
   a bale ejection system configured to discharge bales from the bale chamber on a ground surface of a field, the bale ejection system including:
     a chute having a first half portion and a second half portion, the chute being configured to receive a first bale and a second bale in the first half portion and the second half portion, respectively; and
     an ejection actuator configured to push the second bale from the second half portion of the chute to the first half portion of the chute such that the first bale and the second bale are discharged in a single line on the ground surface of the field,
     wherein the at least one bale position sensor comprises a first bale position sensor configured to sense the presence or absence of the first bale in the first half portion of the chute and a second bale position sensor configured to sense a presence or absence of the second bale in the second half portion of the chute,
     wherein the ejection actuator is configured to push the second bale from the second half portion of the chute to the first half portion of the chute when the second bale position sensor senses the presence of the second bale in the second half portion of the chute and when the first bale position sensor senses the absence of the first bale in the first half portion of the chute.

2. The agricultural baler of claim 1, wherein the chute is angled downwardly from the discharge outlet toward the ground surface of the field to cause a downward sliding movement of the first bale through the first half portion of the chute.

3. The agricultural baler of claim 1, wherein the chute comprises a wall formed at an end of the second half portion of the chute.

4. The agricultural baler of claim 3, wherein the end of the second half portion of the chute is closer to the ground surface of the field than to the discharge outlet.

5. The agricultural baler of claim 3, wherein the wall is configured to prevent a downward sliding movement of the second bale through the second half portion of the chute to the ground surface of the field.

6. The agricultural baler of claim 1, wherein the ejection actuator is arranged in, on or adjacent to the second half portion of the chute.

7. The agricultural baler of claim 1, wherein the ejection actuator comprises a pusher plate configured to engage with a side portion of the second bale.

8. The agricultural baler of claim 7, wherein the ejection actuator is configured to push the second bale from the second half portion of the chute to the first half portion of the chute when the second bale position sensor senses the presence of the second bale on the pusher plate.

9. The agricultural baler of claim 1, wherein the second bale position sensor is arranged near the pusher plate.

10. The agricultural baler of claim 9, wherein the ejection actuator is configured to push the second bale from the second half portion of the chute to the first half portion of the chute after a predetermined period of time expires.

11. An agricultural vehicle comprising the agricultural baler of claim 1.

12. The agricultural baler of claim 7, wherein the pusher plate moves from a first position adjacent a side wall of the bale chamber to a second position at an intersection between the first half portion and the second half portion of the chute.

13. The agricultural baler of claim 12, wherein the first bale moves in a longitudinal direction along the first half portion, and the pusher plate moves between the first and second positions in a transverse direction that is orthogonal to the longitudinal direction.

14. The agricultural baler of claim 13 wherein the second sensor is pointed in the longitudinal direction.

15. The agricultural baler of claim 1, wherein the first half portion and the second half portion of the chute are angled downwardly at a same angle.

16. The agricultural baler of claim 1, wherein the first half portion is angled downwardly with respect to the second half portion of the chute.

17. The agricultural baler of claim 1 further comprising a control system including a controller that receives inputs from the first and second sensors and controls the ejection actuator based upon those inputs.

18. The agricultural baler of claim 1, wherein the first and second sensors are pointed in different directions.

19. The agricultural baler of claim 1, wherein the first half portion and the second half portion terminate at a common edge.

* * * * *